United States Patent
Sanders et al.

(10) Patent No.: US 10,344,402 B2
(45) Date of Patent: Jul. 9, 2019

(54) COMPOSITE STRUCTURAL MATERIAL

(71) Applicant: GM GLOBAL TECHNOLOGY OPERATIONS LLC, Detroit, MI (US)

(72) Inventors: Ronald Sanders, Daxweiler (DE); Hartmut Baumgart, Bischofsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 631 days.

(21) Appl. No.: 14/610,962

(22) Filed: Jan. 30, 2015

(65) Prior Publication Data

US 2015/0218732 A1   Aug. 6, 2015

(30) Foreign Application Priority Data

Feb. 1, 2014   (DE) .................. 10 2014 001 383

(51) Int. Cl.
| | |
|---|---|
| *C08J 5/04* | (2006.01) |
| *D01F 9/08* | (2006.01) |
| *D01F 9/12* | (2006.01) |
| *B29C 70/08* | (2006.01) |
| *D06M 15/71* | (2006.01) |
| *D06M 101/40* | (2006.01) |

(52) U.S. Cl.
CPC ................ *D01F 9/12* (2013.01); *B29C 70/08* (2013.01); *C08J 5/04* (2013.01); *C08J 5/042* (2013.01); *D01F 9/08* (2013.01); *D06M 15/71* (2013.01); *C08J 2300/22* (2013.01); *D06M 2101/40* (2013.01); *Y10T 428/2918* (2015.01)

(58) Field of Classification Search
CPC .... D01F 9/12; D01F 9/08; B29C 70/08; C08J 5/042; C08J 5/04; C08J 2300/22; D06M 15/71; D06M 2101/40; Y10T 428/2918
See application file for complete search history.

(56) References Cited

U.S. PATENT DOCUMENTS

| | | | | |
|---|---|---|---|---|
| 5,260,124 | A | * | 11/1993 | Gaier ....................... B32B 5/24 244/1 A |
| 5,433,998 | A | | 7/1995 | Curzio et al. |
| 6,277,771 | B1 | | 8/2001 | Nishimura et al. |
| 6,492,588 | B1 | * | 12/2002 | Grandy ............... B60R 16/0207 174/120 R |
| 9,656,004 | B2 | * | 5/2017 | Duering ................ A61L 29/126 |
| 2005/0211082 | A1 | * | 9/2005 | Angeloni ............... B29C 70/16 87/3 |
| 2007/0202296 | A1 | | 8/2007 | Chandrasekaran et al. |

(Continued)

FOREIGN PATENT DOCUMENTS

| | | |
|---|---|---|
| DE | 4443616 A1 | 6/1996 |
| DE | 19930000 A1 | 1/2001 |

(Continued)

OTHER PUBLICATIONS

DE 60224127 Machine Translation of description VIA espacenet.*

(Continued)

*Primary Examiner* — Laura C Powers
(74) *Attorney, Agent, or Firm* — Lorenz & Kopf LLP

(57) ABSTRACT

A composite material includes a first component and a second component, each surrounded by a thermoplastic material. The thermoplastic material is joined in a material bond to each of the first component and the second component.

10 Claims, 3 Drawing Sheets

(56) References Cited

U.S. PATENT DOCUMENTS

| | | | | |
|---|---|---|---|---|
| 2008/0036241 A1* | 2/2008 | Aisenbrey | ............... | B62D 29/00 |
| | | | | 296/187.01 |
| 2010/0126134 A1* | 5/2010 | Atkinson | ................ | D01H 1/00 |
| | | | | 57/204 |
| 2012/0163758 A1* | 6/2012 | McCullough | ............ | H01B 7/14 |
| | | | | 385/101 |
| 2013/0122246 A1* | 5/2013 | Berger | ...................... | F16B 5/08 |
| | | | | 428/119 |
| 2013/0302604 A1* | 11/2013 | Branscomb | .............. | D02G 3/44 |
| | | | | 428/365 |

FOREIGN PATENT DOCUMENTS

| | | |
|---|---|---|
| DE | 60224127 T2 | 12/2008 |
| DE | 102011014244 A1 | 9/2012 |
| DE | 102011089287 A1 | 6/2013 |
| WO | 0144548 A1 | 6/2001 |
| WO | WO 2006046008 A1 * | 5/2006 ............ B29C 70/22 |

OTHER PUBLICATIONS

Great Britain Patent Office, Great Britain Examination Report for Great Britain Application No. 501465.7, dated Jul. 5, 2017.
Great Britain Patent Office, Great Britain Search Report for Great Britain Application No. 1501465.7, dated Jul. 28, 2015.

* cited by examiner

Fig. 2

| 202 | 201 | 200 | 201 | 202 |

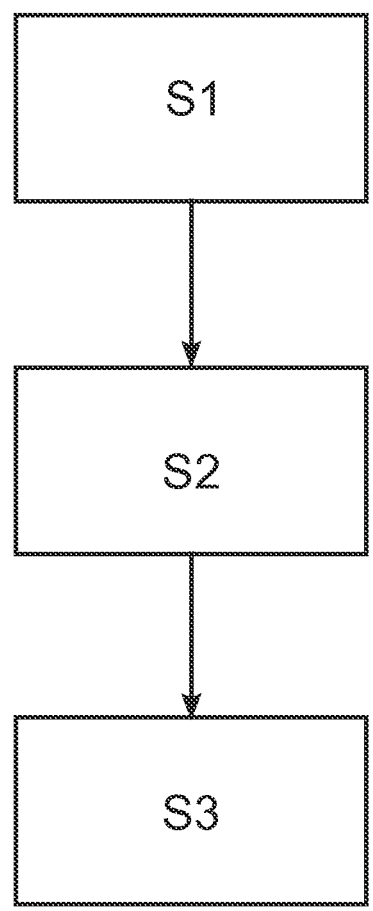

COMPOSITE STRUCTURAL MATERIAL

CROSS-REFERENCE TO RELATED APPLICATION

This application claims priority to German Patent Application No. 102014001383.9, filed Feb. 1, 2014, which is incorporated herein by reference in its entirety.

TECHNICAL FIELD

The present disclosure relates to the technical area of composite materials having multiple components.

BACKGROUND

Document DE 10 2011 089 287 A1 describes a method for producing a mounting interface on a component made from fiber composite material including fibers and a matrix material that surrounds the fibers. A portion of the fibers is exposed. Then, a metal layer is created by coating the exposes fibers directly with a metal material, this is used to produce the mounting interface.

At least one drawback associated with this method and the composite material produced thereby is that production is relatively expensive. Moreover, large differences in the electrochemical potential are often to be expected. These may be present in the transition from the fiber (e.g., carbon) to the coated fiber and/or from the coated fiber to the attached component. This results in undesirable contact corrosion.

In addition, other objects, desirable features and characteristics will become apparent from the subsequent summary and detailed description, and the appended claims, taken in conjunction with the accompanying drawings and this background.

SUMMARY

Given the preceding, the present disclosure provides a composite material that is easier to produce, and with which the risk of contact corrosion is reduced, to create a motor vehicle using such a composite material, and suggest a method for producing such a composite material.

The composite material comprises one first and one second component. The first and second components are each surrounded by a thermoplastic material. The thermoplastic material may be a combination of various materials or a single material. In each case, the thermoplastic materials are connected to the first and second components in a positive material joint. This may be achieved for example by encasing each of the two components in the thermoplastic material during production and then heating them until the thermoplastic material melts and participates in a positive material joint with the components. For purposes of encasing the two components, the same thermoplastic material or different suitable thermoplastic materials may also be used. If different suitable thermoplastic materials are used, said different thermoplastic materials fuse with each other after they are heated.

The encased components may for example be woven together, with the result that, after heating, they are connected to one another indirectly via and by means of the thermoplastic material. The two components are joined to each other galvanically separately from each other.

Since the first and the second components are each completely enclosed by the thermoplastic material, a galvanic separation of the two components is achieved. In this way, the risk of contact corrosion is reduced.

According to one embodiment, the first component may comprise a metal. This may be advantageous, for example, if the composite material is to be connected to another material by a welded joint. In this case, at least one end region of the composite material may be free of the thermoplastic material, thereby exposing the metal. This end region is preferably also free of the second component. Accordingly, the composite material may be connected to another material via the metal. This may be assured by capacitor discharge welding, for example.

In motor vehicle construction, many parts are made of metal. Since the end region of the composite material is free of the second component, the composite material with said end region may be joined to a metal part without causing a large electrochemical potential difference. A relatively small electrochemical potential difference between two metals reduces contact corrosion of the joint.

According to an embodiment, the second component may include carbon. For example, the second component may include carbon fibers. The carbon fibers encased in the thermoplastic material may also be referred to as carbon fiber reinforced plastic. The advantage of carbon fiber reinforced plastics is that they are strong yet relatively lightweight. These are two advantageous properties particularly in motor vehicle construction.

According to an embodiment, the first component may be in the form of a wire. The advantage of this embodiment is that the first component encased in the thermoplastic material may also be wound around and/or woven together with the second component, which is also encased in the thermoplastic material. In this way, a particularly strong connection between the two components is achieved by means of the thermoplastic material.

According to an embodiment, the second component may include fibers. In particular, the second component may include fiber strands which may consist of one or more fibers. If the first component is in the form of a wire and the second component includes fibers, the two components, both of which are encased in the thermoplastic material, may be woven together to form a braid. In particular, this also includes the situation in which the two components encased in the thermoplastic material are wound around each other. The structure of the composite material may also be referred to as a braid structure. This braid structure can serve to compensate particularly effectively for the differing coefficients of thermal expansion of the two components. In addition, the braid structure renders the composite material particularly strong.

It is possible to combine completely different materials. For example, the matrix of a motor vehicle roof may contain carbon fibers. In order to connect the roof to the A-pillars, which are made of steel, steel wires are woven in, and are included in the A-pillar system as pure steel wires. For the connection to the C-pillar, which is made from aluminium, aluminium wires are woven in and are used for creating a connection to the S-pillar. In addition, the thicknesses and strengths of the fibers may be adapted to withstand local loads during continuous running or in the event of a crash.

It is advantageous to weld the composite material with another material, since the composite material might be damaged by a mechanical connection such as a threaded connection. This is particularly true if carbon fibers are used as the second component.

According to an embodiment, the composite material comprises at least one first and one second region. A proportion between the first component and the second may be different in the first region than in the second region. This particularly includes the situation in which the proportion in one of the two regions may be such that the second region contains none of the second component at all.

Different proportions between the two components in various regions of the composite material are particularly advantageous, since a smaller quantity of the second component may be present in an end region of the composite material that may be used for making a connection with another material than may be present in another region, in order to reduce the risk of contact corrosion. In this context, the term "proportion" may refer to a mass ratio or a volume ratio.

According to an embodiment, the composite material may comprise a transition region between the first and second regions. The proportion may vary continuously or incrementally in the transition region. In particular, it is possible that the transition region may be directly adjacent to both the first and the second regions.

According to an embodiment of the invention, the first region and the second region and/or the transition region may comprise the entire cross section of the composite material.

According to an embodiment, the composite material may comprise at least one end region. The at least one end region may be free of the second component. For example, the end region may be the aforementioned second region. It is also possible that the composite material may have two end regions, so that it can be connected to another material particularly advantageously at two positions. If the at least one end region is free of the second component, a braid or woven structure of the first component may be present here. The first component may be encased by the thermoplastic material in the end region or it may not. The end region that is free of the second component is preferably at least 40 mm long.

According to an embodiment, the at least one end region may be free of the thermoplastic material. This may be achieved directly with the encasement, for example, by providing that the first component in the at least one end region is not encased by the thermoplastic material. Alternatively, the first component in the at least one end region which is encased by the thermoplastic material may be heated by means of a short blast of heat. At the same time, the thermoplastic material that is melted thereby may be suctioned off. This region may serve for welding the braided component to the rest of the vehicle body, for example. It may also be configured in such manner that the at least one end region if free of the thermoplastic material. In such case, it must be ensured that the composite material is not heated so intensely outside the end region that the thermoplastic material melts, since it is not to be removed there.

Thus, it is possible that only the first component is present in the at least one end region. This makes it possible for the composite material to be joined to another material, a metal for example, particularly easily. The connection may be made by welding, for example.

A further aspect of the disclosure relates to a motor vehicle that comprises a composite material according to an embodiment described above. The composite material may be joined to a component of the motor vehicle via a welded connection.

Still another aspect of the disclosure relates to a method for producing a composite material according to an embodiment described above. The first and second components are encased in a thermoplastic material. The first component may be completely encased in the thermoplastic material, or only partially encased thereby. The two encased components are then woven together. In this way, a braid may be created from the two encased components. Then, the thermoplastic material is heated so that the first and second components are joined to the thermoplastic material in a material bond.

According to an embodiment, the first component may comprise a metal, and at least one end region thereof may be free of the thermoplastic material. This may be achieved for example if the end region of the first component is not encased in the thermoplastic material.

According to an embodiment, the first component may comprise a metal and may be encased completely in the thermoplastic material. Then, the thermoplastic material may be removed from an end region of the first component again. This simplifies the encasement production step.

According to an embodiment, the thermoplastic material may be melted only in the end region. The melted thermoplastic material may then be suctioned off. In this way, it is also possible to provide that the composite material is free of the thermoplastic material in the end region.

BRIEF DESCRIPTION OF THE DRAWING

The present invention will hereinafter be described in conjunction with the following drawing figures, wherein like numerals denote like elements, and:

FIG. 2 shows a schematic view of a composite materials according to an embodiment of the invention with several regions; and FIG. 3 shows a flowchart of a method according to an embodiment of the invention.

DETAILED DESCRIPTION

Figure 1:
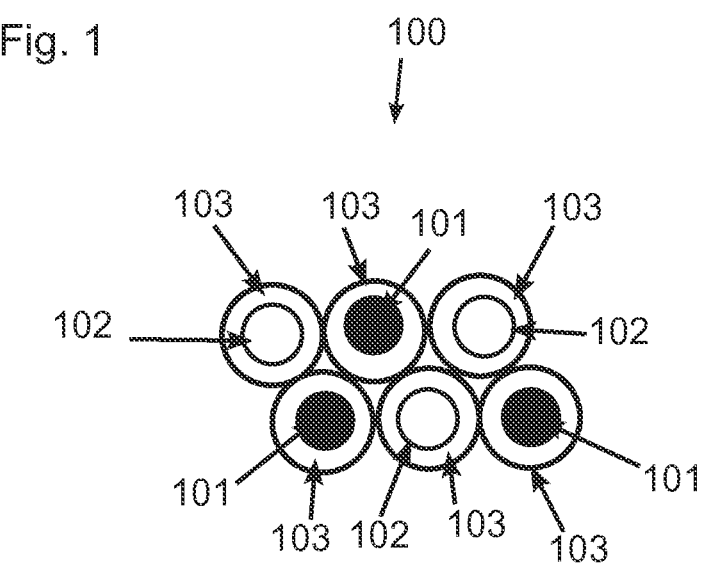
FIG. 1 shows a schematic cross sectional view of a composite material according to an embodiment of the invention.

The following detailed description is merely exemplary in nature and is not intended to limit the invention or the application and uses of the invention. Furthermore, there is no intention to be bound by any theory presented in the preceding background of the invention or the following detailed description.

FIG. 1 is a schematic cross sectional view of a composite material 100 which comprises a first component 101 and a second component 102. First component 101 may be a metal, for example, while second component 102 may be a carbon material. The metal may be in the form of a wire, and the carbon material may be in the form of fibers, for example. In this case, the wires may be woven together with the fibers to form a braid. Such a braid is exceptionally strong. Both the first component 101 and the second component 102 are surrounded by a thermoplastic material 103.

Only three wires of the first component 101 and three fiber strands of the second component 102 are shown, for the sake of clarity. A fiber strand may comprise one or more fibers. In the production process, both components 101 and 102 are first encased in the thermoplastic material 103. Then the encased components 101 and 102 are woven together. Then, the thermoplastic material 103 is heated, which causes it to melt and forms a material bond with components 101 and 102. The individual encasements of the two components 101 and 102 also fuse with each other, thereby creating a more compact composite material in which a braid of the two components 101 and 102 is encased outwardly by the thermoplastic material. The two components 101 and 102 are galvanically separated from each other by the thermoplastic material, thereby reducing the risk of contact corrosion due to differing electrochemical potentials.

Figure 2:
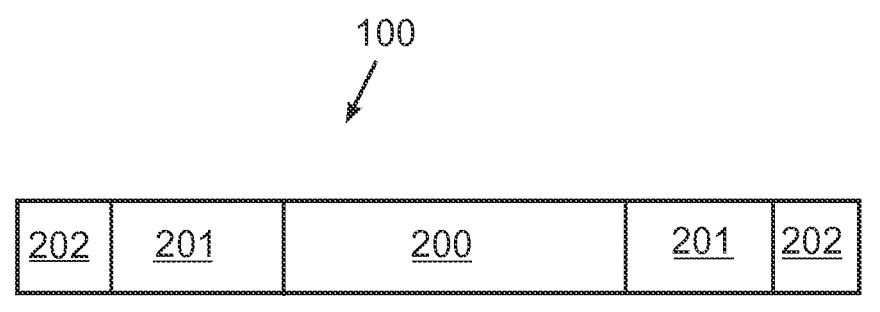

FIG. 2 shows clearly that composite material 100 has a central region 200, two transition regions 201 and two end regions 202. The proportion of first component 101 to second component 102 may be different in the different regions. For example, it is advantageous if second component 103 is not present in end regions 202. Then, the are particularly well suited to making a connection with a different material. For example, if first component 101 is a metal, composite material 100 in end regions 202 may be welded to a component made from the same metal or a different metal.

A continuous proportion may exist between first component 101 and second component 102 in central region 200. The ratio is selected such that the composite material has the desired strength and weight. In this way, the advantages of carbon fiber reinforced plastic may be accessed through the use of carbon fibers as the second component 102.

In transition regions 201, the proportion between the two components 101 and 102 may vary at a constant rate from the value in central region 200 to the value in end regions 202.

In this way, a composite material 100 may be made that is readily able to be joined at the end regions 202 thereof with another material, such as a metal (e.g., by welding), and which has the advantageous properties of a carbon fiber reinforced plastic in the central region 200 thereof.

Finally, with reference to FIG. 3, a method for producing a composite material 100 is described. In step S1, both the first component 101 and the second component 102 are encased with the thermoplastic material 103. This may also be carried out for the two components separately in two independent steps. In this process, the first component may be completely encased, or the end regions 202 thereof may be free of the thermoplastic material 103.

In step S2, the encased components 101 and 102 are woven together, thereby forming a braid structure. Then, in step S3 the thermoplastic material 103 is heated so intensely that it melts and forms a material bond with the two components 101 and 102.

Optionally, the thermoplastic material 103 may be removed from end regions 202 in a further step. This may be effected for example by a locally limited temperature blast while at the same time the thermoplastic material 103 that is melted by the temperature blast is removed by suction.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

The invention claimed is:

1. A composite structural material comprising:
    a first component surrounded by a first thermoplastic material; and
    a second component surrounded by a second thermoplastic material;
    wherein a thermoplastic weld joint of the first thermoplastic material and the second thermoplastic material connects the first component and the second component; and wherein
    the first component is a metal; and
    a first region at an end of the composite structural material and a second region at a central portion of the composite structural material, wherein a quantitative proportion between the first component and the second component in the first region is different than in the second region such that the first region is free of thermoplastic material and the metal is exposed providing a metal welding region.

2. The composite structural material according to claim 1, wherein the first component comprises a metal wire.

3. The composite structural material according to claim 1, wherein the second component comprises a fiber.

4. The composite structural material according to claim 3, wherein the second component comprises a carbon fiber.

5. The composite structural material according to claim 1, wherein the composite structural material further comprises a transition region between the first region and the second region, and wherein the quantitative proportion of the first component to the second component varies from a first proportion to a second proportion in the transition region at a constant rate.

6. The composite structural material according to claim 1, wherein the first region and the second region comprises an entire cross section of the composite structural material.

7. The composite structural material according to claim 1, wherein the composite structural material further comprises a transition region between the first region and the second region, and wherein the quantitative proportion of the first component to the second component varies from a first proportion to a second proportion in the transition region incrementally.

8. The composite structural material according to claim 7, wherein the first region, the second region and the transition region comprises the entire cross section of the composite structural material.

9. The composite structural material according to claim 1, wherein the the first region is free of the second component.

10. A motor vehicle comprising a composite structural material according to claim 1, wherein a welded connection joins the composite structural material and a component of the motor vehicle to form a body or a chassis component of the motor vehicle.

* * * * *